May 5, 1959

C. M. RUBLY 2,885,035

BRAKE MECHANISM

Filed Jan. 4, 1954

INVENTOR.
Charles M. Rubly
His Attorney

May 5, 1959

C. M. RUBLY 2,885,035

BRAKE MECHANISM

Filed Jan. 4, 1954

INVENTOR.
Charles M. Rubly
BY
His Attorney

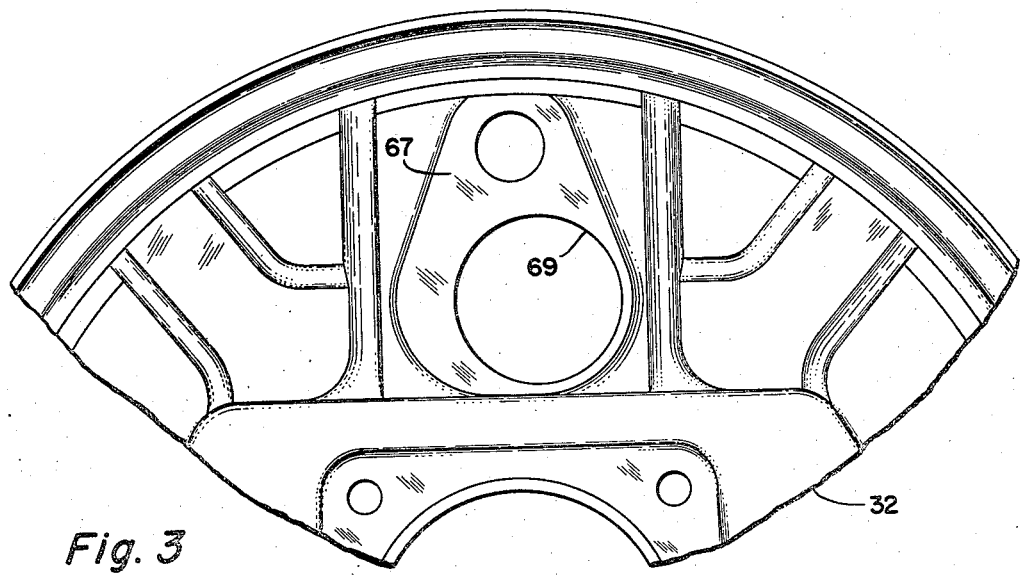
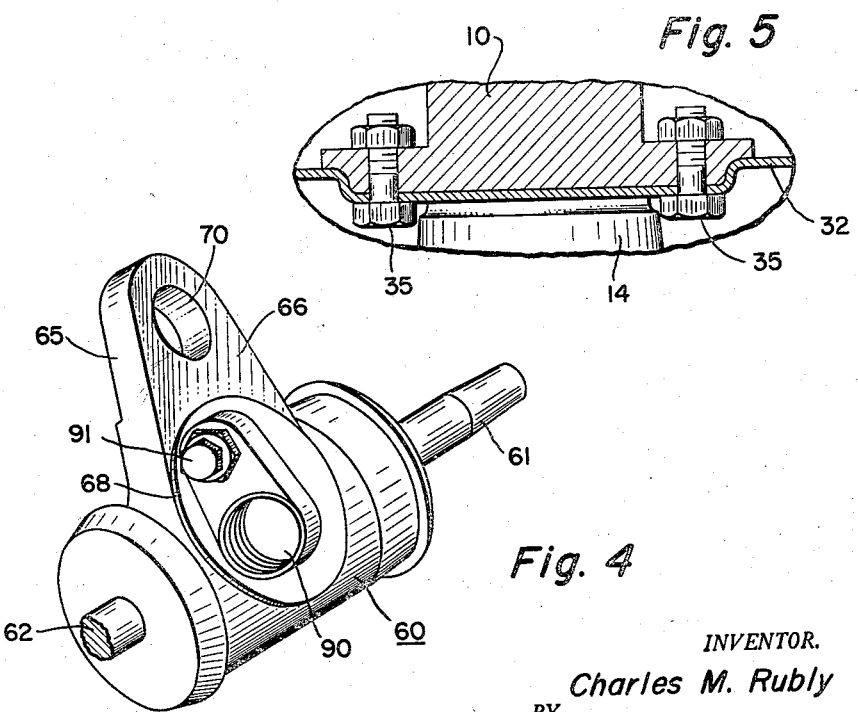

United States Patent Office 2,885,035
Patented May 5, 1959

2,885,035

BRAKE MECHANISM

Charles M. Rubly, Birmingham, Mich., assignor to General Motors Corporation, Detroit, Mich., a corporation of Delaware Application January 4, 1954, Serial No. 401,829

2 Claims. (Cl. 188—206)

This invention relates to a brake structure for a motor vehicle, and particularly to the mounting structure for the wheel cylinder of the brakes.

An object of the invention is to provide a simplified mounting structure for the wheel cylinder of hydraulic brakes used on motor vehicles wherein the wheel cylinder is supported by the steering knuckle of the steering mechanism for the vehicle.

Further objects and advantages of the present invention will be apparent from the following description, reference being had to the accompanying drawings wherein a preferred form of the invention is clearly shown.

In the drawings:

Figure 3 is an elevational view of the backing plate of the brake structure.

Figure 4 is a perspective elevational view of the wheel cylinder for the brakes.

Figure 5 is a cross sectional view taken along line 5—5 of Figure 2.

Figure 1:
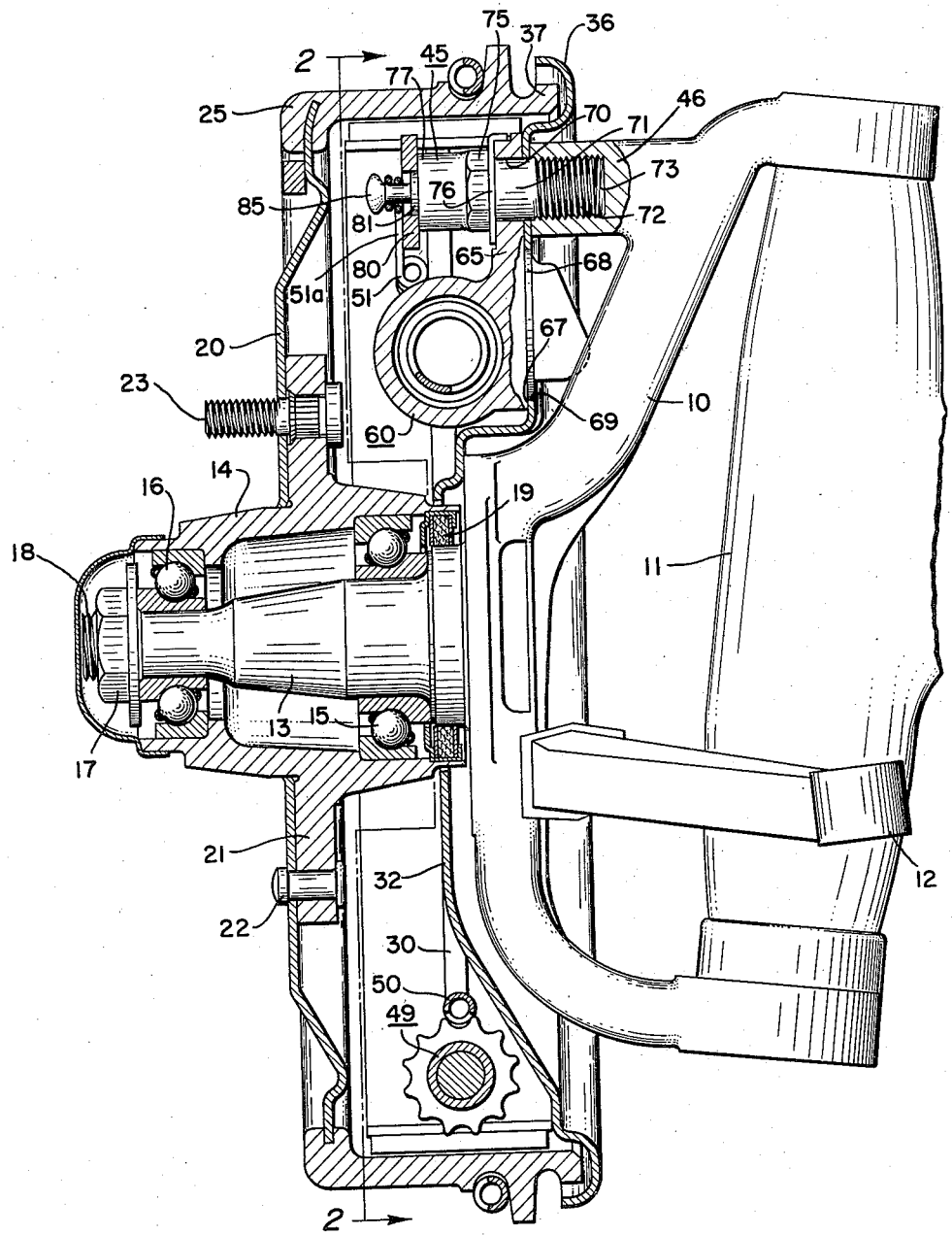
Figure 1 is a vertical cross sectional view through a wheel and brake structure incorporating the feature of this invention as taken along line 1—1 of Figure 2.
Figure 2:
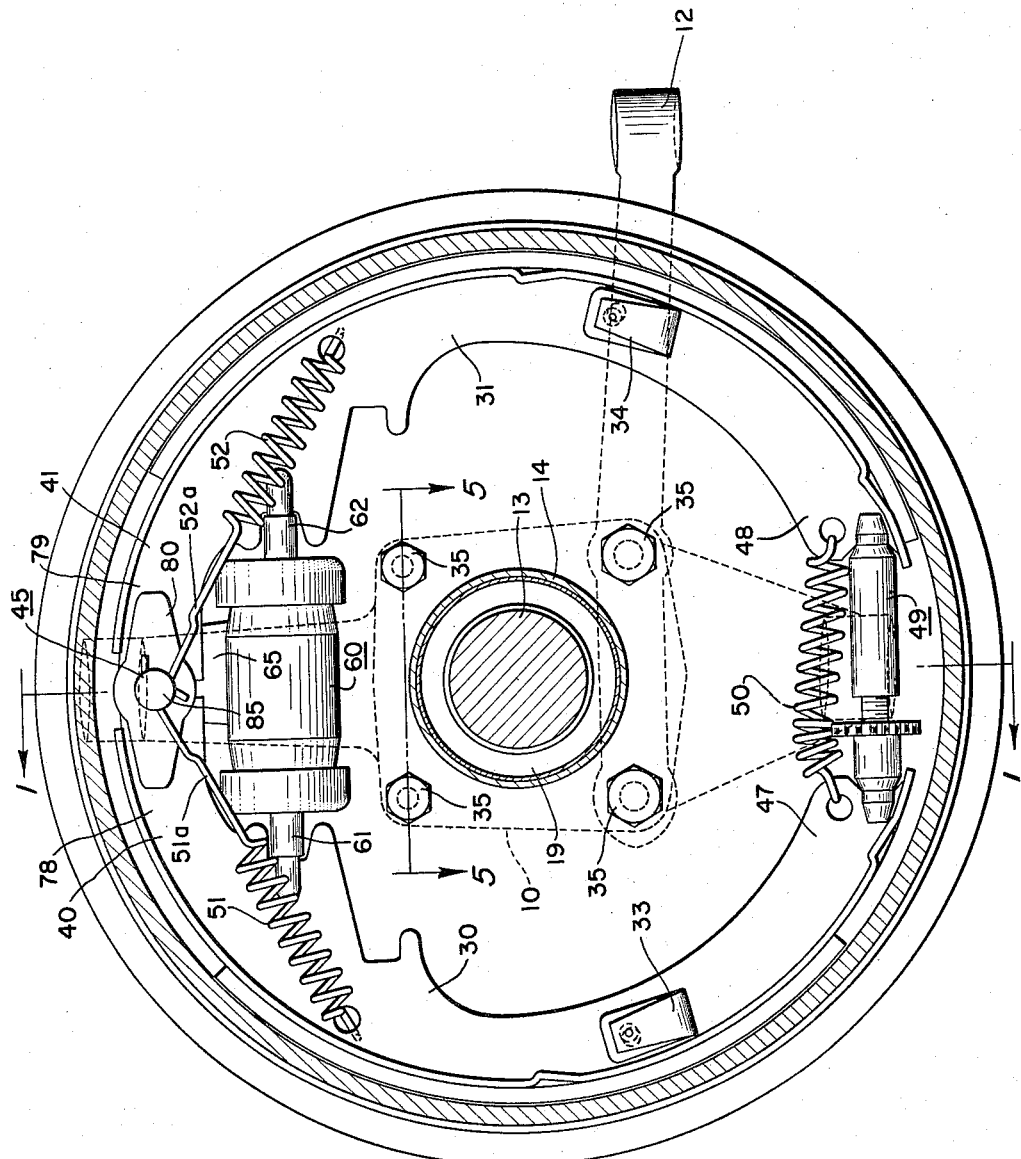
Figure 2 is a transverse cross sectional view taken along line 2—2 of Figure 1.

This invention is particularly applied to hydraulic brake systems for automotive vehicles wherein a hydraulic cylinder and piston arrangement is provided for actuating the brake shoes of a brake structure, the hydraulic cylinder and piston arrangement, that is the wheel cylinder, being positioned within the brake structure for actuation of the brake shoes.

This invention can be applied to a conventional brake structure including a brake drum mounting on a wheel, suitable brake shoes being provided within the drum for operative engagement therewith. A hydraulic wheel cylinder is provided between the brake shoes for actuating them, the brake shoes being placed with adjacent ends of opposing brake shoes engaging an anchor pin. The improvement of this invention comprises placing the wheel cylinder upon the anchor pin for the brake structure which in turn is supported from the steering knuckle of the steering mechanism for the motor vehicle.

The invention is particularly adapted for use in connection with the steering wheels of a motor vehicle.

Referring now to the figures of the drawings, there is disclosed a steering mechanism including a steering knuckle 10 that is carried upon a steering knuckle support 11 that in turn is attached to the front end of a motor vehicle in any conventional manner. The steering knuckle 10 carries a steering arm 12 that is attached to the conventional steering mechanism of a motor vehicle.

The steering knuckle 10 carries an axle spindle 13 that in turn supports a wheel hub 14 by means of the inboard ball bearing set 15 and an outboard ball bearing set 16. The nut 17 threadedly received on the threaded end 18 of the spindle 13 retains the wheel hub 14 in position on the spindle. A grease seal 19 is provided adjacent the exterior side of the inboard bearing 15 whereby to retain lubricant within the hub 14 for the bearings 15 and 16.

The wheel hub 14 supports a brake drum disk 20 that is secured to the hub flange 21 by means of rivets 22. Wheel lugs 23 are provided to support the wheel disk that carries the wheel rim and the tire.

The drum disk 20 actually provides the forward wall of a brake drum that includes the annular drum ring 25 secured to the outer periphery of the drum disk 20.

Within the brake drum comprising the drum ring 25 and drum disk 20 there is provided a pair of brake shoes 30 and 31. The brake shoes are resiliently supported upon the backing plate 32 by means of the hold down springs 33 and 34 in conventional manner.

The backing plate 32 is rigidly mounted upon the steering knuckle 10 by means of the bolts 35. The backing plate 32 has a peripherally formed portion 36 that fits around the exposed end 37 of the drum ring 25 whereby to resist entry of water and dirt to the interior of the brake drum.

The brake shoes 30 and 31 have their adjacent ends 40 and 41 respectively engaging an anchor pin 45 that is threadedly received in a boss 46 protruding from the steering knuckle 10. Opposite adjacent ends 47 and 48 of the brake shoes 30 and 31 engage an adjusting device 49. The brake shoes are retained in engagement with the adjusting device 49 by means of a tension spring 50 extending between the ends 47 and 48 of the brake shoes.

The adjacent ends 40 and 41 of the brake shoes 30 and 31 are retained in engagement with the anchor pin 45 by means of the return springs 51 and 52 respectively.

Adjacent the anchor pin 45 there is positioned a hydraulic wheel cylinder 60 operably connected with the brake shoes 30 and 31 to effect actuation of the brake shoes in response to hydraulic pressure supplied from a master cylinder of the hydraulic brake system. The wheel cylinder 60 is provided with a pair of pistons internally thereof between which the hydraulic fluid from the master cylinder is delivered for effecting axial movement of the operating plungers 61 and 62 that connect with the brake shoes 30 and 31 respectively.

The wheel cylinder 60 has a projecting flange 65 that extends from one side of the wheel cylinder. This flange 65 has a planar face 66 that engages a corresponding planar face 67 on the backing plate 32 to provide a substantial surface engagement and support for the wheel cylinder upon the surface of the backing plate 32. Projecting from the planar surface 66 on the flange 65 there is a projection 68 that extends through an opening 69 in the backing plate 32 whereby to fixedly position the wheel cylinder 60 relative to the anchor pin 45.

The flange portion 65 has a hole 70 therein through which the shank 71 of the ancor pin 45 extends with the threaded end 72 of the shank in threaded engagement with the threaded hole 73 in the boss extension 46 on the steering knuckle 10. The wheel cylinder 60 is thus supported solely by the anchor pin 45 with the protrusion 68 on the wheel cylinder preventing rotation of the wheel cylinder about the anchor pin 45.

The anchor pin 45 has a nut portion 75 that also forms a shoulder relative to the shank 71 of the anchor pin which engages a locking washer 76 engaging the flange 65 of the wheel cylinder whereby the flange 65 is fixedly secured to the face 67 of the backing plate 32.

The forward end 77 of the anchor pin 45 is cylindrical in contour and is engaged by suitable semicircular notches in the edges of the webs 78 and 79 of the brake shoes 30 and 31 respectively. A guide plate 80 is carried upon the reduced diameter portion 81 of the anchor pin 45 to retain the brake shoe webs in engagement with the end 77 of the anchor pin 45. The return springs 51 and 52 have their ends 51a and 52a respectively looped over the projecting end 85 of the anchor pin 45 to retain the guide plate 80 upon the anchor pin.

With the wheel cylinder 60 mounted upon the anchor pin 45 directly carried upon the steering knuckle 10, the weight of metal used in the backing plate 32 can be considerably reduced since there is substantially no brake forces required to be absorbed by the packing plate 32, all of the braking force now being accepted by the anchor pin 45 carried directly on the steering knuckle 10 which of necessity must be a member of substantial strength. The assembly of the wheel cylinder in the manner set forth in this invention substantially reduces the cost of manufacture and assembly of the brake structure without in any way impairing the efficiency of the brakes.

The wheel cylinder 60 is provided with an inlet connection 90 through which fluid under pressure is supplied to the wheel cylinder from the master cylinder of the hydraulic brake system, a suitable pipe fitting being received in the threaded inlet connection 90. A bleed-off connection 91 is provided for servicing of the brake system to bleed the hydraulic lines to the brake cylinder. Both the inlet connection 90 and the bleed-off connection 91 are positioned on the extension 68 protruding from the planar face 66 of the flange 65 of the wheel cylinder whereby to provide for ready access to these connections from the inboard face of the backing plate 32.

While the form of embodiment of the invention as herein disclosed constitutes a preferred form, it is to be understood that other forms might be adopted as may come within the scope of the claims which follow.

What is claimed is as follows:

1. In a vehicle drum brake comprising in combination, a steering and wheel support member having an axle spindle extending therefrom and having an anchor pin mounting projection extending therefrom parallel to said axle spindle, said mounting projection having a planar mounting face on the end extremity thereof disposed normal to said axle spindle and including a mounting opening receiving one end of an anchor pin, means for securing said anchor pin therein, a wheel including a brake drum rotatably mounted on said spindle, two brake shoes for frictionally engaging the inner periphery of said brake drum and having cooperative adjacent ends, an adjustable strut operatively positioned between and engaging two of said cooperative adjacent ends of said brake shoes, a wheel cylinder operatively positioned and engaging two opposite cooperative adjacent ends of said brake shoes, an anchor pin disposed between and engaged by said two opposite cooperative adjacent ends of said brake shoes in the rest position, retraction springs between said anchor pin and said brake shoes to resiliently maintain said engagement of said anchor pin and said brake shoes in the rest position, a backing plate adjacent to and concentric with said brake drum and demountably secured to said wheel and steering support member, said backing plate operating as a dust shield for said braking structure and having a perforation for receiving a projecting portion of said wheel cylinder provided solely for non-rotative alignment between an anchor pin and said wheel cylinder, said wheel cylinder having a tangential extending flange provided with a planar surface cooperable with said planar surface on said mounting projection for mounting of the cylinder on one side of said backing plate with the backing plate disposed between said planar surfaces, and having a protrusion extending from said flange through said perforation in said backing plate to provide said alignment of said wheel cylinder in relation to said anchor pin, said anchor pin having a flange portion engaging said wheel cylinder flange and having an axially extending portion extending through the flange and a perforation in said backing plate into said mounting opening in said mounting projection to retain thereby said planar surfaces in engagement with opposite sides of said backing plate and provide the sole means supporting said cylinder on said mounting projection to relieve said backing plate of torque and transverse thrusts created by activation of said shoes by said cylinder.

2. In a vehicle drum brake comprising in combination, a steering and wheel support member having an axle spindle extending therefrom, a wheel carried on said spindle and including a brake drum, two brake shoes within said drum for frictionally engaging the inner periphery of said brake drum, an adjustable strut operatively engaging two of the cooperative adjacent ends of said brake shoes, a fluid pressure wheel cylinder operatively engaging the two opposite cooperative adjacent ends of said brake shoes, an anchor pin positioned between said opposite two cooperative adjacent ends of said brake shoes, retraction means maintaining contact of said two opposite cooperative adjacent ends of said brake shoes with said anchor pin when said shoes are in a retracted position, a backing plate mounted adjacent to and concentric with said brake drum and demountably secured to said steering and wheel support member, said wheel cylinder having a tangentially extending flange including a flat mounting surface substantially parallel with the center line of said wheel cylinder to provide mounting means for said wheel cylinder, said tangential flange having a protrusion extending from the flat mounting surface on said flange extending through a perforation provided in said backing plate to provide non-rotating relationship of said wheel cylinder relative to said anchor pin, said anchor pin having a radial flange portion contacting said tangential flange of said wheel cylinder, said anchor pin having a cylindrical intermediate portion adjacent to said radial flange portion, said intermediate cylindrical portion extending through a perforation in the tangential extending flange on said wheel cylinder and also extending through a second perforation in said backing plate, said anchor pin having a threaded portion extending beyond said backing plate and threadedly engaging said wheel support and steering member to demountably secure said wheel cylinder and said anchor pin in non-rotative relationship with each other on said steering and wheel support member and provide the sole mounting means for said anchor pin and said wheel cylinder and eliminate the transfer of torque or transverse thrust to said backing plate.

References Cited in the file of this patent

UNITED STATES PATENTS

| | | |
|---|---|---|
| 1,764,178 | Loughead | June 17, 1930 |
| 1,843,571 | Lyman | Feb. 2, 1932 |
| 2,057,723 | La Brie | Oct. 20, 1936 |
| 2,140,741 | Goepfrich | Dec. 20, 1938 |
| 2,146,855 | Schnell | Feb. 14, 1939 |
| 2,312,224 | Weatherhead | Feb. 23, 1943 |
| 2,556,767 | McCann | June 12, 1951 |
| 2,623,613 | Booth | Dec. 30, 1952 |

FOREIGN PATENTS

| | | |
|---|---|---|
| 854,076 | France | Jan. 2, 1940 |
| 358,555 | Great Britain | Oct. 7, 1931 |
| 561,349 | Great Britain | May 16, 1944 |
| 598,636 | Great Britain | Feb. 23, 1948 |